(12) United States Patent
Wu

(10) Patent No.: US 7,549,652 B2
(45) Date of Patent: Jun. 23, 2009

(54) WHEEL ASSEMBLY FOR LUGGAGE

(75) Inventor: Chen-Chuan Wu, Hsin Chuang (TW)

(73) Assignee: Hersun Plastic Co., Ltd., Taipei (TW)

( * ) Notice: Subject to any disclaimer, the term of this patent is extended or adjusted under 35 U.S.C. 154(b) by 434 days.

(21) Appl. No.: 11/425,341

(22) Filed: Jun. 20, 2006

(65) Prior Publication Data

US 2007/0290465 A1   Dec. 20, 2007

(51) Int. Cl.
*A45C 5/14* (2006.01)
(52) U.S. Cl. .................. 280/37; 280/63; 190/18 A; 160/80
(58) Field of Classification Search .............. 280/37, 280/63; 190/18 A; 160/80
See application file for complete search history.

(56) References Cited

U.S. PATENT DOCUMENTS

| | | | | |
|---|---|---|---|---|
| 5,456,342 A | * | 10/1995 | Rekuc et al. ............... | 190/18 A |
| 5,782,325 A | * | 7/1998 | O'Shea et al. ............ | 190/18 A |
| 5,865,281 A | * | 2/1999 | Wang ......................... | 190/115 |
| 6,167,994 B1 | * | 1/2001 | Kuo et al. ................. | 190/18 A |
| 6,193,324 B1 | * | 2/2001 | Chang .................... | 301/111.05 |
| 6,231,130 B1 | * | 5/2001 | Chang .................... | 301/111.05 |
| 6,367,602 B1 | * | 4/2002 | Chang ...................... | 190/18 A |
| 6,374,969 B1 | * | 4/2002 | Young ....................... | 190/18 A |
| 6,575,493 B1 | * | 6/2003 | Lowenstein .............. | 280/655.1 |
| 2003/0019705 A1 | * | 1/2003 | Lau ........................... | 190/18 A |
| 2005/0082776 A1 | * | 4/2005 | Nordstrom et al. ............ | 280/37 |
| 2008/0251341 A1 | * | 10/2008 | Murdoch et al. .......... | 190/18 A |

\* cited by examiner

*Primary Examiner*—Christopher P Ellis
*Assistant Examiner*—John R Olszewski

(57) ABSTRACT

A wheel assembly for luggage includes a main body having at least a slot, and a fitting member having an identification portion. The identification portion defines a shape corresponding to the shape of the slot, and engages with the slot and extends out of an outer surface of the main body. Such identification portion of different luggages is distinguished from each other, which makes the travelers can easily identify their luggage from similar luggages.

4 Claims, 7 Drawing Sheets

WHEEL ASSEMBLY FOR LUGGAGE

BACKGROUND

The present invention relates to a wheel assembly for luggage, and more particularly to a wheel assembly having a fitting assembly to enable it being easily identified, which is employed in luggages.

Nowadays, since the advent of modern travel, people have been able to travel great distances in only a short period of time. As such, the number and frequency of trips taken have increased rapidly. With so many people traveling with such increasing frequency, the number of suitcases and other luggage items transported by common carriers have also increased. Referring to FIG. 1, the luggage 100 includes a wheel assembly 91 disposed at a bottom portion thereof, which includes a wheel 92 and a side plate 93.

However, the large number of luggage items transported creates problems for travelers when, at the end of a trip, each passenger must retrieve luggage, which is almost inevitably mixed in with other passenger's luggage. This task becomes even more difficult due to the similar appearance of many travel luggages and suitcases.

Accordingly, what is needed is a wheel assembly for luggages that can overcome the above-described deficiencies.

BRIEF SUMMARY

Accordingly, the present invention is to provide a wheel assembly for luggage, which makes the luggage that employs this wheel assembly to be easily identified.

An exemplary wheel assembly for luggage includes a main body having at least a slot, and a fitting member having an identification portion. The identification portion has a shape corresponding to the shape of the slot, and engages with the slot and extends out of an outer surface of the main body.

The slot is disposed at a side plate of the main body.

The side plate defines at least a molded passage at an inner surface thereof, and adjacent to the slot.

The fitting member is made of metal material.

The fitting member defines at least a fastener integrated with the identification portion.

The fastener is bended extended from an end of the identification portion, and the fastener defines at least a hole for engaging with the molded passage of the side plate.

The fitting member sticks and fixes on the main body.

The slot has a circular shape, and the identification portion has a shape corresponding to that of the slot.

Other advantages and novel features will become more apparent from the following detailed description when taken in conjunction with the accompanying drawings.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
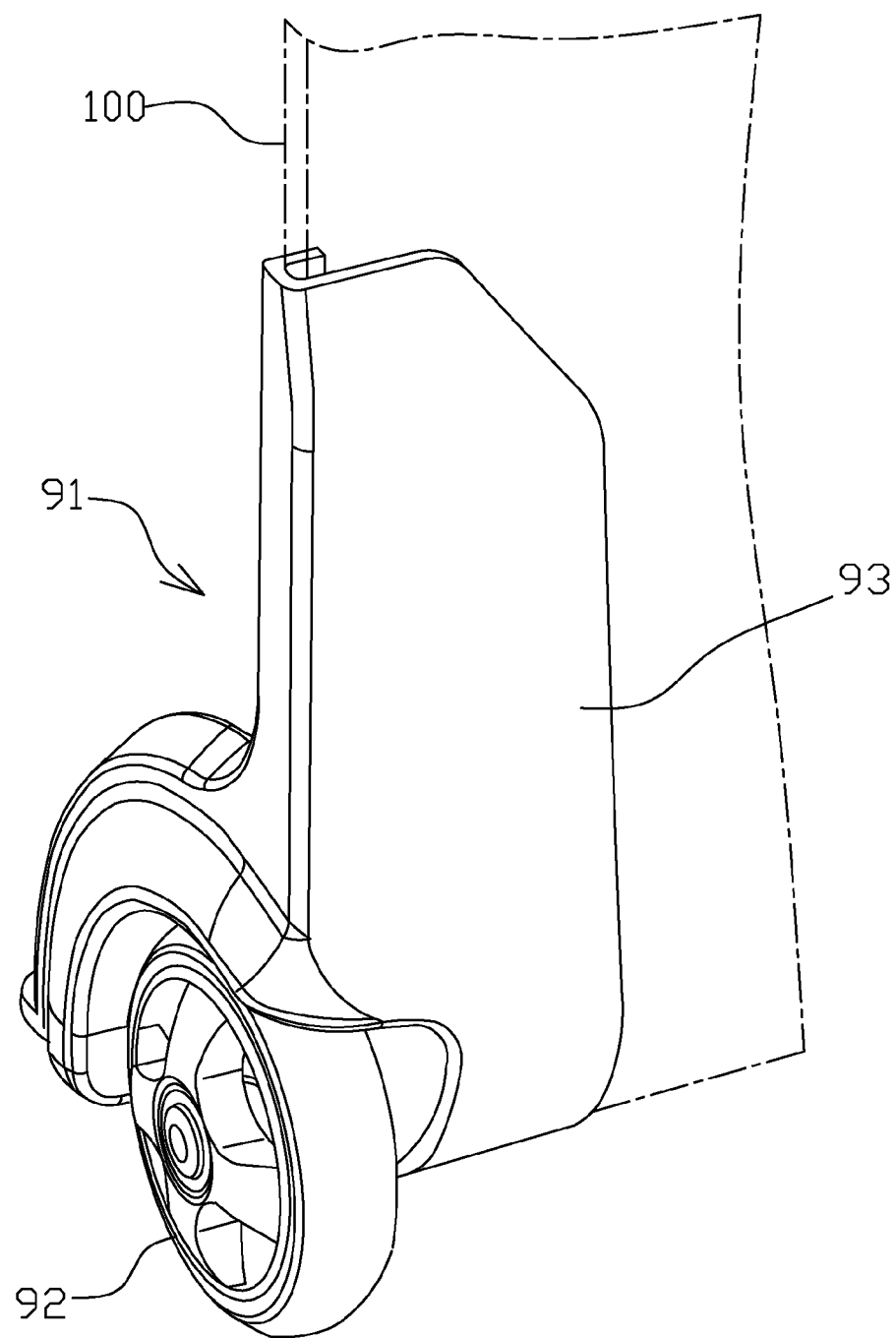
FIG. 1 is a schematic, isometric view of a conventional wheel assembly.
Figure 2:
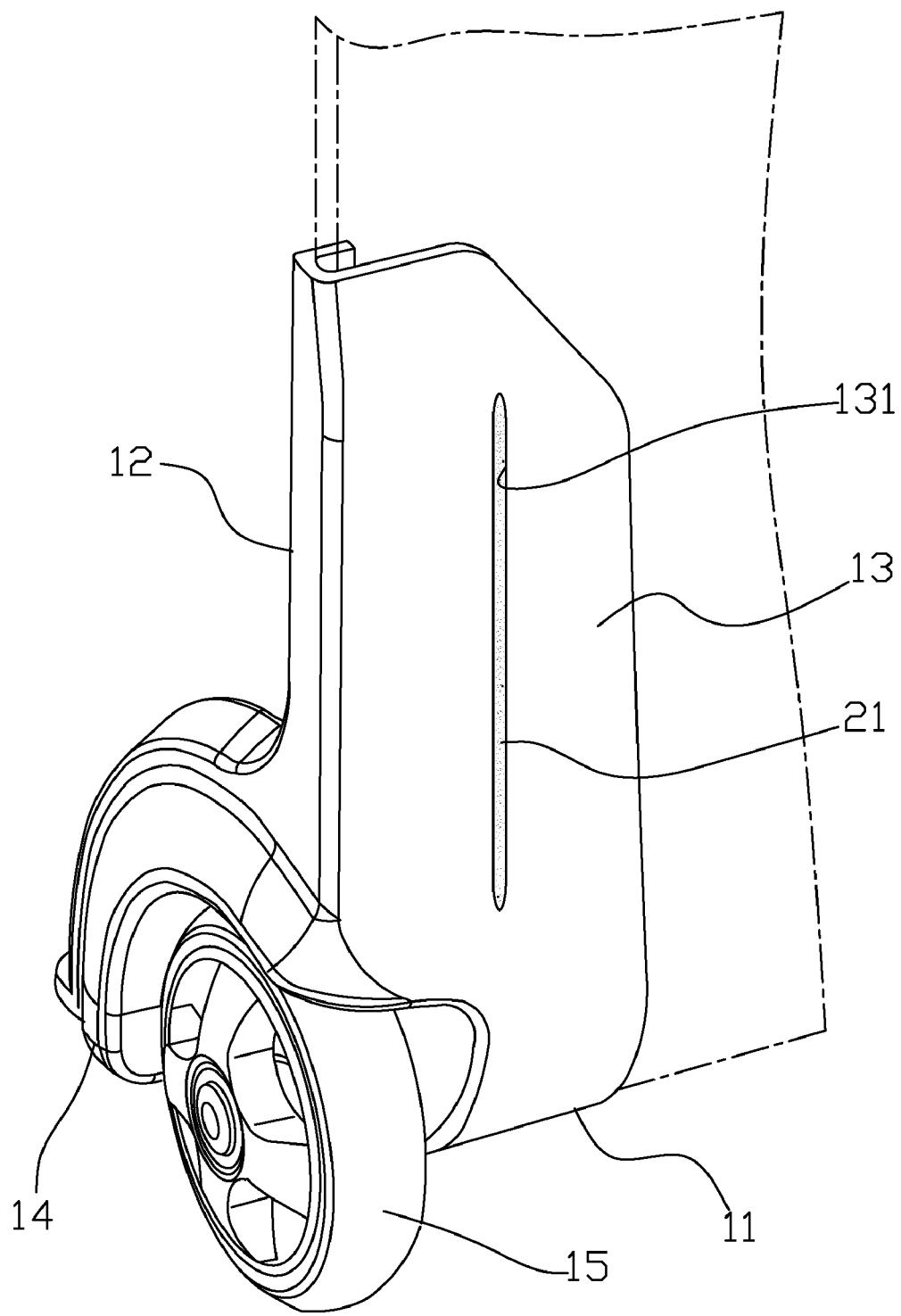
FIG. 2 is a schematic, isometric view of a wheel assembly according to a first embodiment of the present invention, showing the wheel assembly being employed in a luggage.
Figure 3:
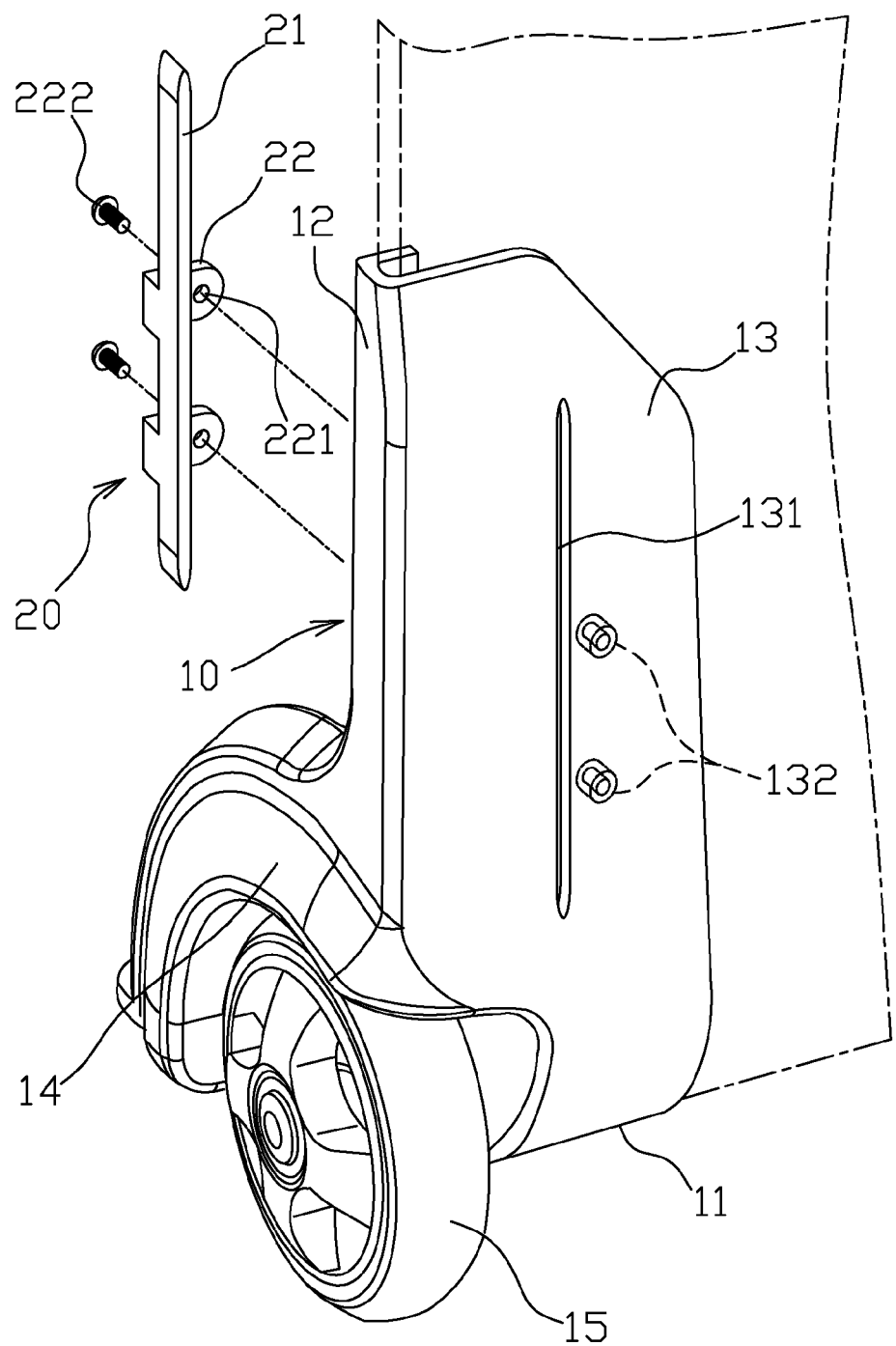
FIG. 3 is a schematic, exploded view of the wheel assembly of FIG. 2.
Figure 4A:
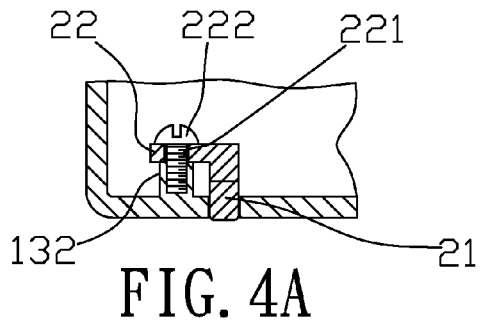
FIG. 4A is a schematic, cross-sectional view taken along the line A-A of FIG. 4.
Figures 4, 5:
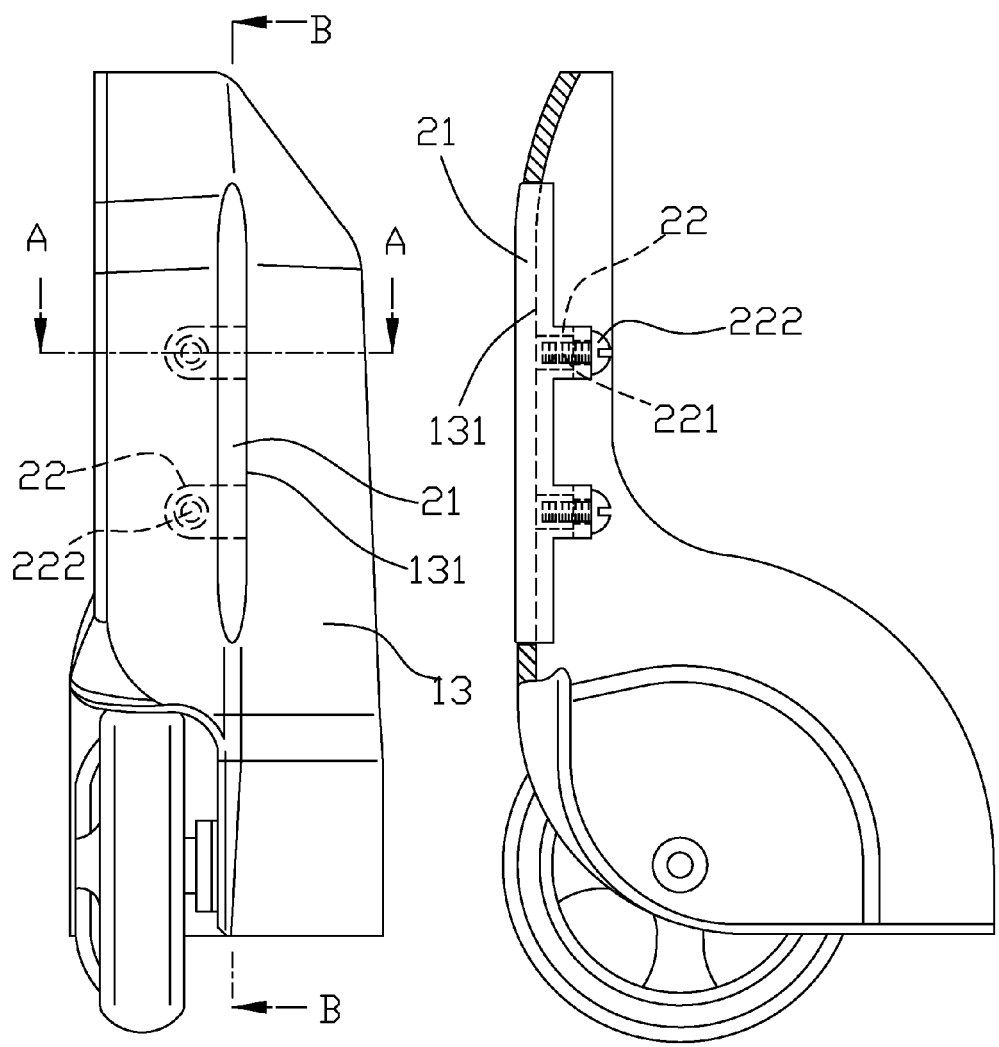
FIG. 4 is a schematic, side view of the wheel assembly of FIG. 2.
FIG. 5 is a schematic, cross-sectional view taken along line B-B of FIG. 4.

Referring to FIGS. 2-5, the wheel assembly includes a main body 10 and a fitting member 20.

The main body 10 includes a bottom plate 11, an engaging plate 12, and a side plate 13. The bottom plate 11 defines a wheel housing 14 for pivotally engaging with a wheel 15. The engaging plate 12 engages with the luggage body adjacent to a bottom portion of the luggage (not labeled), which makes the wheel assembly fix to the luggage body. The side plate 13 is disposed at a bottom portion of the wheel assembly, which defines a slot 131. The side plate 13 further includes two molded passages 132 at an inner surface thereof, adjacent to the slot 131.

The fitting member 20 includes an identification portion 21 and two fasteners 22. The identification portion 21 has a shape essentially the same corresponding to the shape of the slot 131, and engages with the slot 131 and extends out of an outer surface of the side plate 13. The two fasteners 22 are integrated with the identification portion 21, which are bended extended from an end of the identification portion 21. Each of the fasteners defines a hole 221 for making the fasteners 22 engage with the molded passages 132 of the side plate 13 via inserting screws 222 through the hole 221 and then fix to the molded passages 132.

The fitting member 20 may be made of metal material, for example, aluminum. Other materials can be selected according to the requests of design.

The identification portion 21 is disposed at an outer surface of the side plate 13, which is distinct to owner. And the identification portions of different luggages may be designed as distinguished from each other, which makes the travelers easily identify their luggage from similar luggages.

Various modifications and alterations are possible within the ambit of the invention herein. For example, the fitting member 20 may stick on the side plate 131. That is, the identification portion 21 extends out of the side plate 13 from an outer surface thereof, and meanwhile sticks other portion of the fitting member 20 on an inner surface of the side plate 13 to fix the fitting member 20 to the main body 10 of the wheel assembly.

Figure 6:
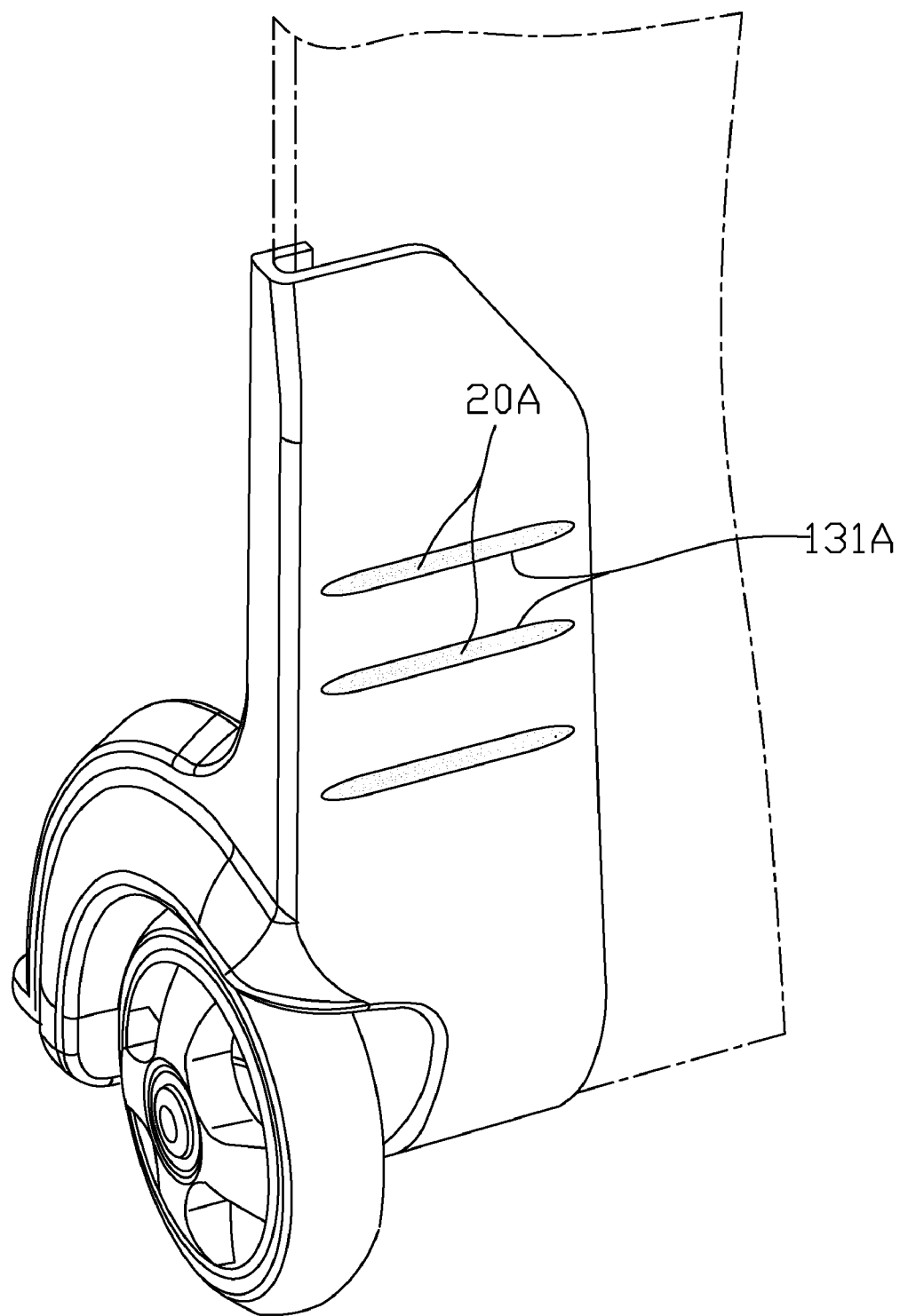
FIG. 6 is a schematic, isometric view of a wheel assembly according to a second embodiment of the present invention.

Referring to FIG. 6, a schematic, isometric view of a wheel assembly according to a second embodiment of the present invention is shown. The wheel assembly has a structure similar to the wheel assembly of the first embodiment. However, the main body 10 of the wheel assembly includes a plurality of slots 131A, and each of the slots 131A is engaged with an identification portion 20A. The plurality of identification portions 20A makes it more obvious to the travelers.

Figure 7:
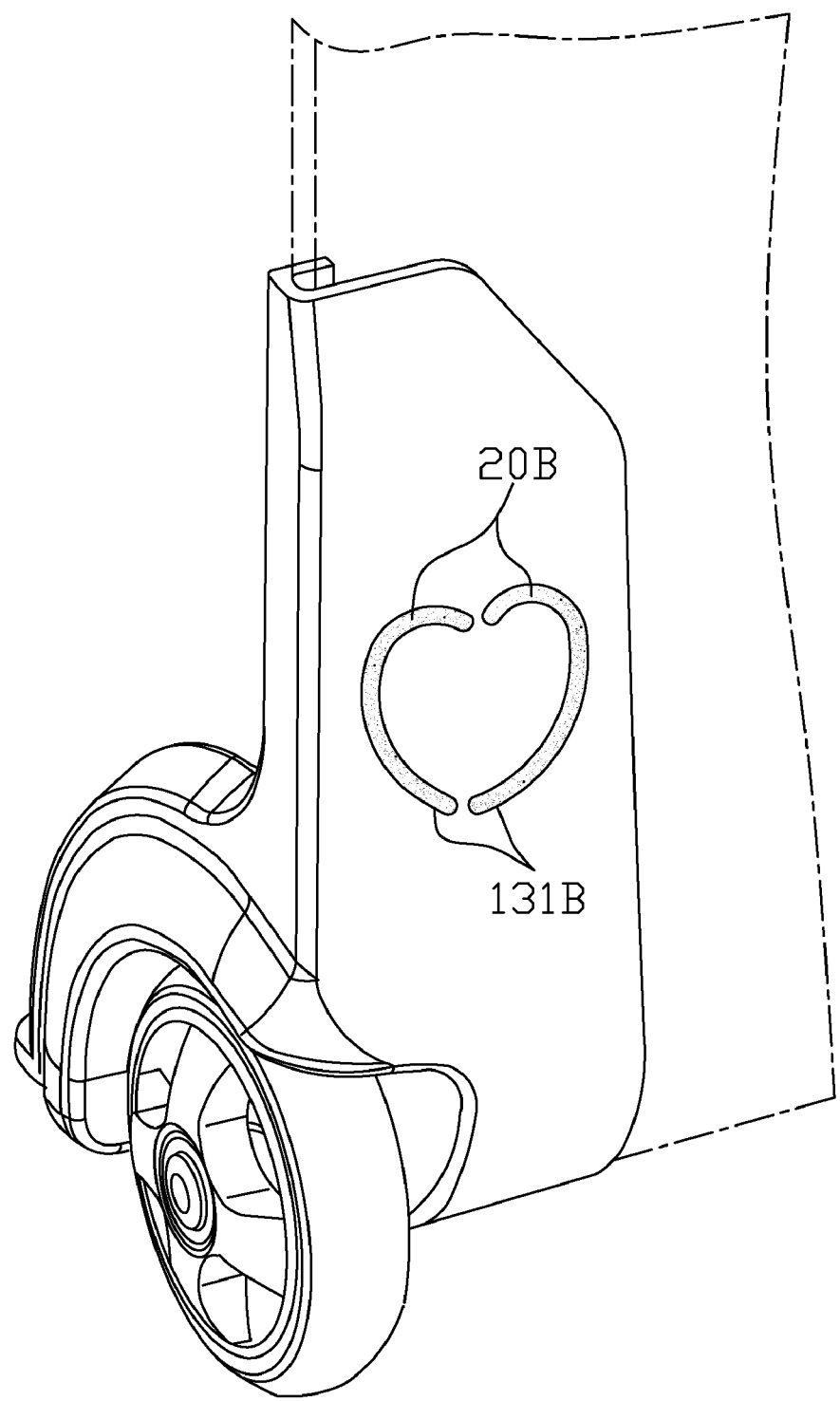
FIG. 7 is a schematic, isometric view of a wheel assembly according to a third embodiment of the present invention.

Also referring to FIG. 7, the slots 131B may have a cardioids-shape, and the identification portion 20B also has a cardioids-shape protruding therefrom.

Figure 8:
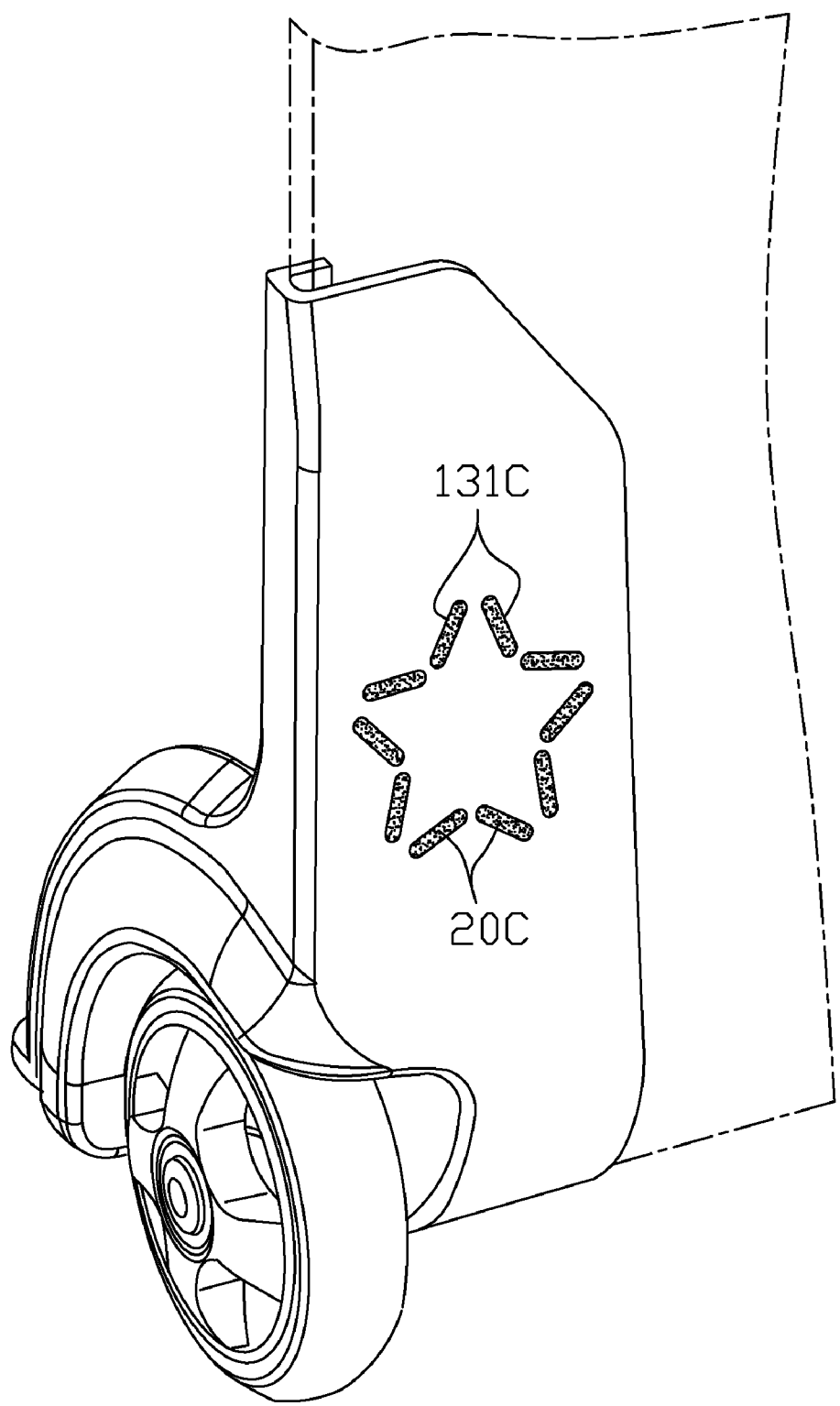
FIG. 8 is a schematic, isometric view of a wheel assembly according to a fourth embodiment of the present invention.

Referring to FIG. 8, the slots 131C may have a pentagram shape, and the identification portion 20 B also has a pentagram shape protruding therefrom.

The shape of the identification portions are not limited, it can be circular, rectangular or the like. All the shaped can also be arranged in pairs or groups to make each wheel assembly having a different identification portion. Then the travelers can easily identify their luggage from similar luggages via different and obvious identification portions.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A wheel assembly for luggage, comprising:
   a main body including at least a slot; and
   a fitting member including an identification portion, the identification portion having a shape corresponding to that of the slot, and the identification portion engaging with the slot and extending out of an outer surface of the main body,
   wherein the slot is disposed at a side plate of the main body
   wherein the side plate includes at least a molded passage at an inner surface thereof, and adjacent to the slot,
   wherein the fitting member includes at least a fastener intecirated with the identification portion, and
   wherein the fastener is bended to be extended from an end of the identification portion, and the fastener includes at least a hole for engaging with the molded passage of the side plate.

2. The wheel assembly as claimed in claim 1, wherein the fitting member is made of metal material.

3. The wheel assembly as claimed in claim 1, wherein the fitting member sticks and fixes on the main body.

4. The wheel assembly as claimed in claim 1, wherein the slot has a circular shape, and the identification portion has a shape corresponding to that of the slot.

* * * * *